United States Patent [19]
Grout et al.

[11] Patent Number: 4,772,386
[45] Date of Patent: Sep. 20, 1988

[54] FILTER WITH LIQUID METER

[75] Inventors: Edward C. Grout, Mequon; Nolan K. Rhoades, Beloit; James W. Schwerdt, Mequon; Robert H. Ahrens, Janesville, all of Wis.

[73] Assignee: Autotrol Corporation, Milwaukee, Wis.

[21] Appl. No.: 869,151

[22] Filed: May 30, 1986

[51] Int. Cl.⁴ .................................. B01D 27/10
[52] U.S. Cl. .................................. 210/91; 210/100; 210/282
[58] Field of Search .................. 210/85, 87, 91, 97, 210/100, 282, 287

[56] References Cited
U.S. PATENT DOCUMENTS 1,883,805 10/1932 Martin et al. .................. 210/100
3,367,503 2/1968 Topol .......................... 210/100
3,406,827 10/1968 Topol et al. .................. 210/100

Primary Examiner—Ivars Cintins
Attorney, Agent, or Firm—Quarles & Brady

[57] ABSTRACT

A replaceable filter cartridge is mounted in a housing body having an inlet and an outlet permanently attached to a line carrying the liquid to be filtered. The filter cartridge contains activated charcoal. An outlet in the filter cartridge can be closed by a buoyant poppet valve which is normally held out of engagement with its valve seat by a trigger wire. An impeller is rotated by the flow of the liquid through the cartridge and the impeller drives a toothed disc which abrades the trigger wire. The abrading eventually cuts through the wire and releases the poppet which then seats against the valve seat of the outlet and renders the cartridge inoperative. The amount of abrading of the trigger wire is proportional to the flow of liquid through the cartridge and the trigger wire is sized to fail after a quantity of liquid has passed through the filter sufficient to exhaust the filtering capabilities of the cartridge. The spent cartridge must be replaced with a new filter cartridge. The presence of a filter cartridge is sensed by one proximity switch and the closing of the outlet valve provides an electrical signal to indicate that the cartridge has been rendered inoperative.

20 Claims, 2 Drawing Sheets

FILTER WITH LIQUID METER

BACKGROUND OF THE INVENTION

This invention relates to filters for water or other liquids, and particularly to a filter assembly which will be rendered partially or wholly inoperative after a predetermined quantity of liquid has passed through the filter media.

Filters are often employed at a point of use in a water supply to remove health threatening contaminants, or to remove undesirable and unpleasant odors or tastes from the water. The point of use filtration is the preferred location because it can remove any contaminants or odors which develop within the distribution system of the residence or building.

One contaminant which is recommended for removal by filters is trihalomethane which is apparently formed by chlorine in the presence of certain organic matter. Activated charcoal is a common filter media which can remove trihalomethane. Activated charcoal is also useful for removing other contaminants and is widely used for removing odors or tastes. One of the problems with the use of activated charcoal filters is that the filter media will become saturated with contaminants and be no longer effective long before any change in the water quality can be detected by the user.

One approach that has been used to signal the saturation of a charcoal filter media involves the use of a flow meter in the line leading from the filter. The flow meter is set for a predetermined total volume representing the capacity of the filter media. When that volume of water has passed through the flow meter, a shut off valve is closed thereby blocking the line. Such flow meters include an impeller rotated by the flow of water or other liquid and gearing connecting the impeller to the shut off valve which is actuated after a predetermined number of rotations by the impeller. Such mechanical devices have some operational drawbacks, and most importantly, the protection which they afford can be defeated by the user by simply resetting the flow meter without replacing the filter media.

SUMMARY OF THE INVENTION

In accordance with the invention a filter cartridge is provided that can be inserted in a liquid line and which includes a cartridge case with an inlet, an outlet valve, a filter media between the inlet and outlet valve, abradable means normally holding the outlet valve open, and means responsive to the flow of water through the filter media for abrading the abradable means in proportion to the flow of liquid until the abradable means fails and the outlet valve closes. The closing of the outlet valve may completely halt the flow of liquid through the filter or the closing may so restrict the flow of fluid that the pressure drop will be both noticeable and unacceptable.

Further in accordance with the invention, the filter cartridge may be replaceable and may be removably mounted in a housing body having an inlet and an outlet permanently attached to the liquid line, and which may be opened to accept the filter cartridge. The spent replaceable filter cartridge will, when actuated by the flow of a predetermined quantity of liquid, be required to be removed before full and acceptable flow of liquid through the liquid line is achieved.

The replaceable filter cartridge may also, when in place, trigger a proximity switch which can be used to signal the presence of a cartridge at a remote location or control the delivery of the liquid through the line. In this manner, the system cannot be defeated simply by removing a spent cartridge.

Further in accordance with the invention, the closing of the outlet valve may provide an electric signal which can be used for visual or audible signaling or for signaling at remote locations.

In the preferred embodiment the outlet valve includes a floatable poppet and the abradable means, which normally holds the poppet away from a valve seat, consists of a trigger wire. The trigger wire is abraded by a toothed disc which rotates with an impeller driven by the flow of water through the filter. The abrading eventually cuts through the wire and releases the poppet which then seats against the valve seat of the outlet valve. The proximity switch can be a reed switch mounted in the housing and actuated by a permanent magnet located in the cartridge. The electric signal may be provided by another reed switch located in the housing and actuated by a permanent magnet attached to the poppet. The magnet will move to actuate the reed switch when the poppet is released by the failure of the trigger wire.

It is a principal object of the invention to provide a filter for water or other liquid which requires replacement of the filter media after it has been subjected to a predetermined volume of liquid.

It is another object of the invention to provide such a filter which will produce an electrical signal when the filter media is to be replaced so that the condition of the filter can be monitored from a remote location.

It is yet another object of the invention to provide a replaceable filter cartridge which includes an integral metering valve that will close when the filter media in the cartridge is spent.

The foregoing and other objects and advantages of the invention will appear in the following detailed description. In the description reference is made to the accompanying drawings which illustrate preferred embodiments of the invention.

DETAILED DESCRIPTION OF THE PREFERRED EMBODIMENTS

Figure 1:
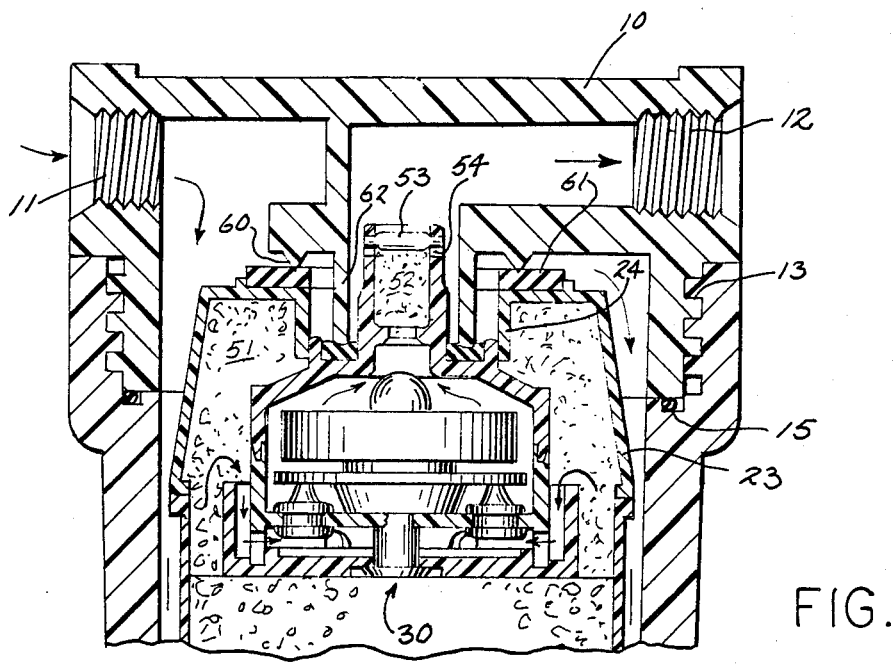
FIG. 1 is a foreshortened view in vertical section taken through a filter in accordance with the present invention.
Figure 2:
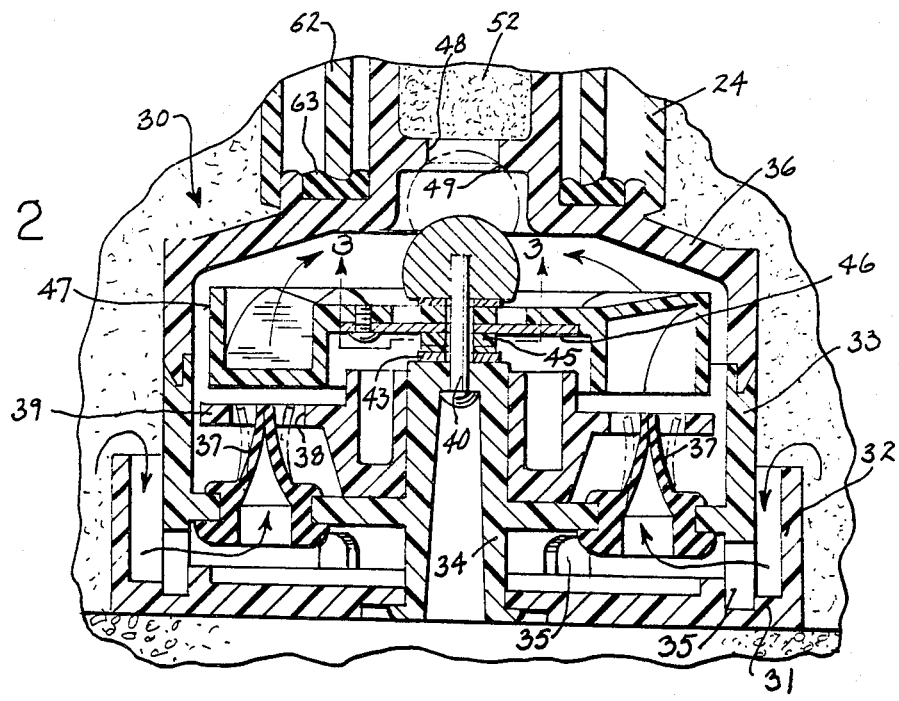
FIG. 2 is an enlarged view in vertical section of the metering valve assembly of the filter of FIG. 1.

Referring to the drawings, the filter includes a housing formed by body 10 having a threaded inlet 11 and a threaded outlet 12 both of which are adapted to be permanently connected into the water line or other liquid line being filtered. The body 10 includes a circular cylindrical threaded flange 13 to which is attached a canister 14 to complete the housing. The canister 14 includes an O-ring 15 that seals with the edge of the body 10.

Disposed within the housing is an expendable filter cartridge 20 having a case 21 formed from a lower half 22 that is in the shape of a can and an upper portion 23 that is generally dish shaped with a large central circular opening defined by an inwardly extending flange 24. The case portions 22 and 23 may be formed of injection molded plastic and may be joined together by solvent or sonic welding. The lower case portion 22 has an imperforate bottom 25 with a central recess 26 that is seated on a boss 27 formed in the center of the canister 14.

A metering valve assembly 30 is disposed within the filter cartridge case 21 and attached to the central flange 24. The assembly 30 includes a base section 31 having an upstanding cylindrical flange 32, a belt section 33 with a central pedestal 34 that is heat staked to the base 31 and with a series of spaced openings 35, and an upper section 36 that is attached to the belt section 33 by ultrasonic welding. The belt section 33 mounts a pair of duck billed nozzles 37 whose expandable outlets extend through openings 38 in a filler block 39 mounted about the pedestal 34. The pedestal 34 also supports a headed trigger wire 40 whose top end is cemented to a valve poppet 41 of cork or other buoyant material. Captured between the top of the pedestal 34 and the poppet 41 are upper and lower thrust washers 42 and 43, upper and lower friction reducing spacers 44 and 45, and a central abrading disc 46. The disc 46 is mounted at the center of a rotatable impeller 47. The upper section 36 defines an outlet port 48 including a valve seat 49 against which the poppet 41 can seat. The upper section 36 is joined to the central flange 24 of the cartridge case 21 by solvent or sonic welding.

The lower portion 22 of the cartridge case 21 is filled with particles of activated charcoal 50. The space between the assembly 30 and the surrounding cartridge case 21 above the level of the charcoal 50 is filled by a porous foamed plastic media 51. Another volume of a porous foamed plastic media 52 is disposed in the upper section 36 beyond the valve seat 49 and is held in place by a retainer 53. The upper section 36 includes radial liquid openings 54 below the retainer 53.

The cartridge 20 is held in place between the boss 27 and a circular knife edge 60 in the base 10 which seats against a flexible sealing disc 61 cemented to the top of the cartridge case 21 about the central flange 24. The base 10 also has an integral projecting circular tube 62 that is coaxial with the circular knife edge 60. The tube 62 is adapted to have its bottom end seat against a flexible sealing disc 63 cemented to the top of the upper section 36.

When the cartridge 20 is installed and held between the boss 27 at one end and the knife edge 60 and tube 62 at the other end, water or other liquid entering the inlet 11 must pass through the imperforate bottom 25 of the cartridge case 21, up through the bed of charcoal 50, through the foam filter 51 over the flange 32 at the base section 31 of the metering valve assembly 30. The water can then pass through the openings 35 in the belt section 34 to the interior of the valve assembly 30. The water or other liquid can then pass through the nozzles 37 which will concentrate the flow and increase the speed of flow of the liquid as it comes in contact with the vanes of the impeller 47. The filler block 39 will reduce eddy currents in the flowing liquid. The impeller 47 will be rotated at a relatively high rate of speed by the water flowing from the nozzles 37. The water can exit through the outlet port 48 while the poppet 41 is held away from the seat 49 by the trigger wire 40.

Figure 3:
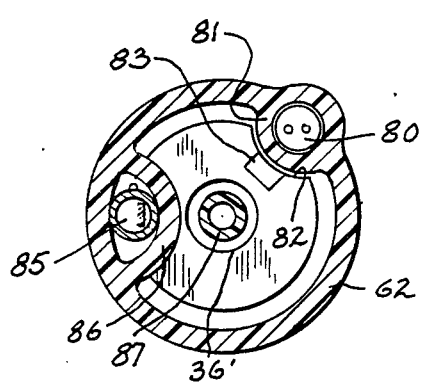
FIG. 3 is an enlarged plan view of the toothed central opening of the abrading disc.

As shown in FIG. 3, the abrading disc 46 has a central opening 70 which is provided with a series of sharp inclined teeth 71 over a portion of its perimeter. Eccentric weights in the form of screws 72 are disposed in the abrading disc 46 to the opposite side of center from the teeth 71. The arrangement of teeth 71 and eccentric weights 72 will cause the impeller 47 and its attached disc 46 to rotate eccentrically and to wobble. The impeller 47 is free to move radially by the presence of the friction reducing spacers 44 and 45 which may be formed of tetraethylflouride or other similar material known for its low friction properties. The continuous rotation of the impeller 47 and disc 46 will abrade the trigger wire 40 until the trigger wire is cut in two. When that occurs, the poppet 41 is no longer restrained by the trigger wire 40 and the poppet 41 can rise by reason of its buoyancy until it seats against the valve seat 49. This closes the outlet port 48 and thereby halts the flow of water through the filter cartridge 20.

In its path of travel through the filter cartridge 20, the water or other liquid will first encounter the activated charcoal 50, and then the porous plastic foam filter 51 which will further filter the water and remove any particles of charcoal that would otherwise be washed with the water. The water will finally encounter the final foam filter 52 which will trap particles removed from the trigger wire 40 by the abrading disc 46.

If desired, the valve seat 49 can be provided with radial notches which allow some water to continue to flow through the filter even when the poppet 41 is against the valve seat, so that the user is not cut off abruptly from the water supply. However, such a reduced flow should be both obvious to the user and at such a low rate that it is unacceptable to the user except for short term uses, so that a spent cartridge 20 cannot be continued to be used.

By selection of materials of the abrading disc 46 and of the trigger wire 40, the number of rotations of the impeller 47, and therefore the volume of water which must pass through the filter before the trigger wire is severed, can be selected with accuracy and repeatability. A size of trigger wire 40 is selected in relation to the volume of the charcoal filter media 50 in the filter cartridge 20 so that the trigger wire will be severed at or prior to the time at which the filter media loses its effectiveness. For example, using a stainless steel abrading disc 46 and an aluminum rod or tube having a cross section of 0.0048 square inches as the trigger wire, about 800 gallons of water would flow through the filter cartridge before the trigger wire would fail.

After the trigger wire 40 has failed, the entire cartridge 20 must be replaced with a new cartridge with fresh filter media. Replacement of the spent cartridge with a new cartridge will restore the flow of water or other liquid. However, the removal of the spent cartridge without replacement with a new cartridge will also open flow between the inlet 11 and outlet 12. The embodiment of FIGS. 4 and 5 includes means that can prevent the use of the filter without an operating filter cartridge and also provides for remote detection of a spent cartridge.

Figure 4:
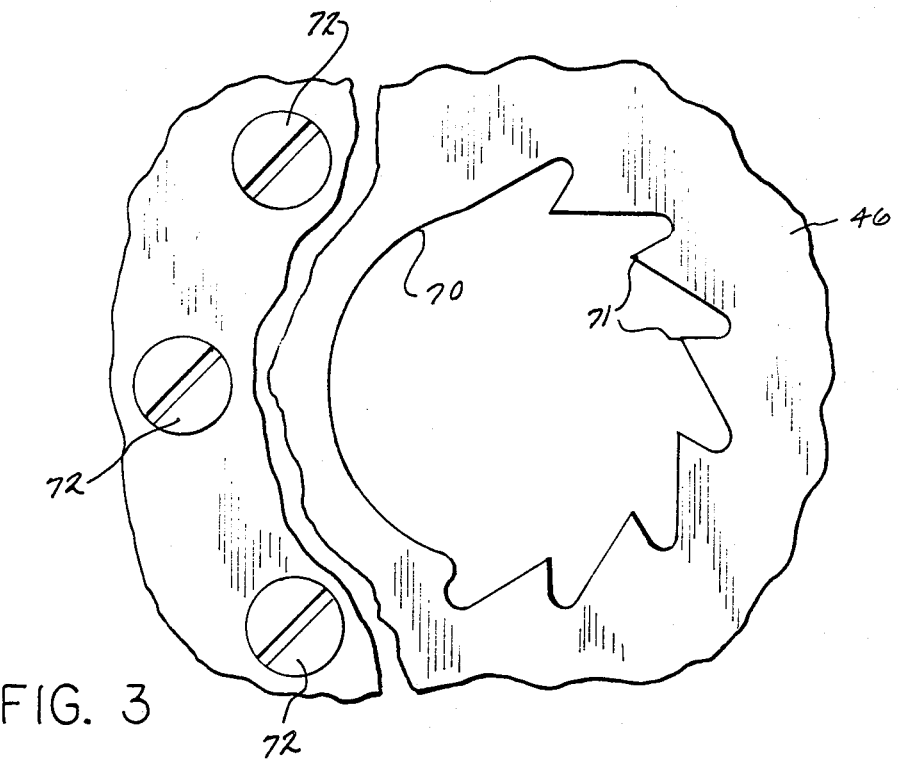
FIG. 4 is a view in vertical section through an alternative embodiment and showing the outlet valve and reed switches and switch actuaters for providing an electric signals indicating the presence of the filter cartridge and that the outlet valve has closed.
Figure 5:
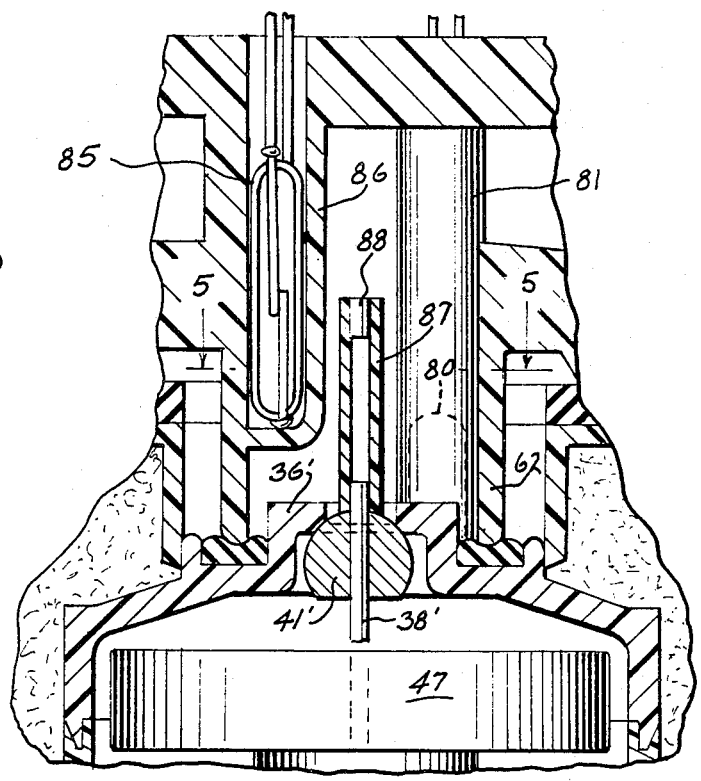
FIG. 5 is a view in horizontal section taken in the plane of the line 5—5 of FIG. 4.

In the embodiment of FIGS. 4 and 5, a proximity reed switch 80 rests in a well 81 protruding inwardly from the tube 62 in the base 10. The reed switch 80 is at a level that confronts the top of a modified upper section 36' of the valve assembly. The upper section 36' has a recess 82 that mates with the protruding well 81 to circumferentially orient the cartridge. A permanent magnet 83 is mounted in the upper section 36' to actuate the proximity reed switch 80. Thus, the proximity reed switch is actuated only when a filter cartridge with the permanent magnet 83 is in place within the housing. The proximity reed switch 80 may be a normally closed switch that is opened by the presence of the magnet 83. When the cartridge with its magnet is not present, the switch 80 can complete a circuit to a visual or audible alarm or generate a signal at a remote location. The closed reed switch 80 may also actuate a solenoid valve which halts all flow of liquid through the distribution system.

The embodiment of FIGS. 4 and 5 includes a second reed switch 85 nestled in a well 86 provided in the tube 62 of the base 10 above the valve assembly. The poppet 41' has a tube 87 extending from its top and the trigger wire 38' extends partially through the poppet 41 and the tube 87. A permanent magnet 88 is mounted in the top end of the tube 87 beyond the trigger wire 40'. The second reed switch 85 is actuated by the movement of the permanent magnet 88 into proximity with the reed switch 85 when the poppet 41' is released by the trigger wire 40' being severed. The actuation of the reed switch 85 can be sensed from a remote position to determine that the filter cartridge is spent and needs to be replaced.

We claim:

1. A replaceable filter cartridge for insertion in a water line, comprising:
    a cartridge case;
    a filter media in said case;
    an outlet valve in the cartridge;
    abradable means normally holding the outlet valve open; and
    means responsive to the flow of water through the filter media for abrading said abradable means in proportion to the flow of water through the filter media until the abradable means fails and the outlet valve closes.

2. A filter cartridge in accordance with claim 1 wherein said filter media is charcoal.

3. A filter cartridge in accordance with claim 1 wherein said outlet valve includes an outlet port with a valve seat and a buoyant valve poppet.

4. A filter cartridge in accordance with claim 3 wherein said abradable means is a trigger wire that normally anchors the poppet away from the valve seat.

5. A filter cartridge in accordance with claim 4 wherein said flow responsive means comprises an impeller rotated by the flow of water through the filter media and a toothed disc abrading the trigger wire.

6. A filter cartridge in accordance with claim 3 together with signal generating means including a reed switch and a permanent magnet attached to the poppet to actuate the switch when the poppet closes the outlet valve.

7. A filter cartridge in accordance with claim 1 together with means for generating an electric signal when the outlet valve closes.

8. A filter for a liquid, comprising:
    a separable housing having an inlet and an outlet; and
    a replaceable cartridge in said housing, said cartridge including
    a cartridge case having a liquid inlet in communication with the inlet in the housing, and an outlet port in communication with the outlet in the housing,
    a filter media in the case,
    a valve adapted to close the outlet port,
    abradable means normally holding the valve away from the outlet port, and
    means response to the flow of liquid through the filter media for abrading said abradable means in proportion to the flow of liquid until said abradable means fails and the valve closes the outlet port.

9. A filter in accordance with claim 8 wherein said filter media is charcoal.

10. A filter cartridge in accordance with claim 8 wherein said filter media is charcoal and a porous foamed plastic.

11. A filter in accordance with claim 8 wherein said outlet valve includes an outlet port with a valve seat and a buoyant valve poppet.

12. A filter in accordance with claim 11 wherein said abradable means is a trigger wire that normally anchors the poppet away from the valve seat.

13. A filter in accordance with claim 12 wherein said flow responsive means comprises an impeller rotated by the flow of water through the filter media and an abrading disc abrading the trigger wire.

14. A filter in accordance with claim 11 together with signal generating means including a reed switch mounted in said housing and a permanent magnet attached to the poppet to actuate the switch when the poppet closes the outlet valve.

15. A filter in accordance with claim 8 together with means for generating an electric signal when said outlet valve closes.

16. A filter in accordance with claim 8 together with means for generating an electric signal when the cartridge is in place in said housing.

17. A filter in accordance with claim 8 together with a proximity reed switch in said housing and a permanent magnet on said cartridge that will actuate the proximity switch when the cartridge is in place in the housing.

18. A filter in accordance with claim 8 wherein said housing includes a body defining the inlet and outlet and a removable canister for supporting the cartridge.

19. A filter in accordance with claim 18 wherein said cartridge is held between the canister and the body, and the body has means that seal with the cartridge about the outlet port of the cartridge.

20. A filter in accordance with claim 19 wherein said cartridge case has an imperforate bottom wall opposite the outlet port.

* * * * *